US010146689B2

(12) United States Patent
Schlansker et al.

(10) Patent No.: US 10,146,689 B2
(45) Date of Patent: Dec. 4, 2018

(54) LOCALLY POLL FLAG IN MULTI PROCESSING NODE SYSTEM TO DETERMINE WHETHER A RESOURCE IS FREE TO USE FOR THREAD

(71) Applicant: HEWLETT PACKARD ENTERPRISE DEVELOPMENT LP, Houston, TX (US)

(72) Inventors: Michael Schlansker, Los Altos, CA (US); Jean Tourrilhes, Mountain View, CA (US); Charles B. Morrey, III, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/411,647

(22) Filed: Jan. 20, 2017

(65) Prior Publication Data
US 2018/0210833 A1     Jul. 26, 2018

(51) Int. Cl.
| G06F 12/08 | (2016.01) |
| G06F 12/0815 | (2016.01) |
| G06F 12/0804 | (2016.01) |

(52) U.S. Cl.
CPC ...... G06F 12/0815 (2013.01); G06F 12/0804 (2013.01); G06F 2212/60 (2013.01)

(58) Field of Classification Search
None
See application file for complete search history.

(56) References Cited

U.S. PATENT DOCUMENTS

| 6,480,918 | B1 * | 11/2002 | McKenney | G06F 9/526 |
| | | | | 710/200 |
| 6,965,893 | B1 | 11/2005 | Chan et al. | |
| 6,965,961 | B1 | 11/2005 | Scott | |
| 7,409,525 | B1 | 8/2008 | Clark et al. | |
| 8,832,388 | B2 | 9/2014 | Ross et al. | |
| 8,966,222 | B2 | 2/2015 | Pakhunov et al. | |
| 9,158,597 | B2 | 10/2015 | Ross | |
| 9,189,413 | B2 | 11/2015 | McKenney | |
| 2004/0034747 | A1 | 2/2004 | Rowlands et al. | |
| 2006/0143416 | A1 | 6/2006 | Kamigata et al. | |

(Continued)

FOREIGN PATENT DOCUMENTS

WO     WO-2017123208 A1     7/2017

OTHER PUBLICATIONS

Lozi, J-P. et al.; "Fast and Portable Locking for Multicore Architectures"; Jan. 7, 2016; 63 pages.

(Continued)

*Primary Examiner* — Kevin Verbrugge
(74) *Attorney, Agent, or Firm* — Hewlett Packard Enterprise Patent Department

(57) ABSTRACT

Examples disclosed herein relate to locally polling the value of a flag to determine whether a resource is free for a thread to use in a system with multiple processing nodes that are incoherent with regards to each other. A flag in a direct attached memory to one of the processing nodes is set to indicate that the resource is not free for the thread to use. A previous tail of a lock list is determined from a list master. The previous tail is located on another one of the processing nodes.

19 Claims, 5 Drawing Sheets

(56) References Cited

U.S. PATENT DOCUMENTS

2011/0191561 A1 8/2011 Brassow
2015/0052104 A1 2/2015 Shadmon

OTHER PUBLICATIONS

Schmid, P. et al.; "High-performance Distributed RMA Locks"; Apr. 22, 2016; 12 pages.
International Search Report & Written Opinion received in related PCT Application No. PCT/US2018/014613, dated May 21, 2018, 14 pages.

* cited by examiner

LOCALLY POLL FLAG IN MULTI PROCESSING NODE SYSTEM TO DETERMINE WHETHER A RESOURCE IS FREE TO USE FOR THREAD

BACKGROUND

When shared memory is scaled to support a very large number of processors, significant benefits may be achieved. Large-scale shared memory architectures offer the potential for fine-grained data sharing across very large systems that are difficult with a traditional cluster computer using fast networks such as Ethernet or InfiniBand. For example, shared memory architectures can exploit benefits of emerging word-addressable non-volatile storage memory and can efficiently share persistent data across hundreds or thousands of processors.

BRIEF DESCRIPTION OF THE DRAWINGS

The following detailed description references the drawings, wherein.

Figure 1:
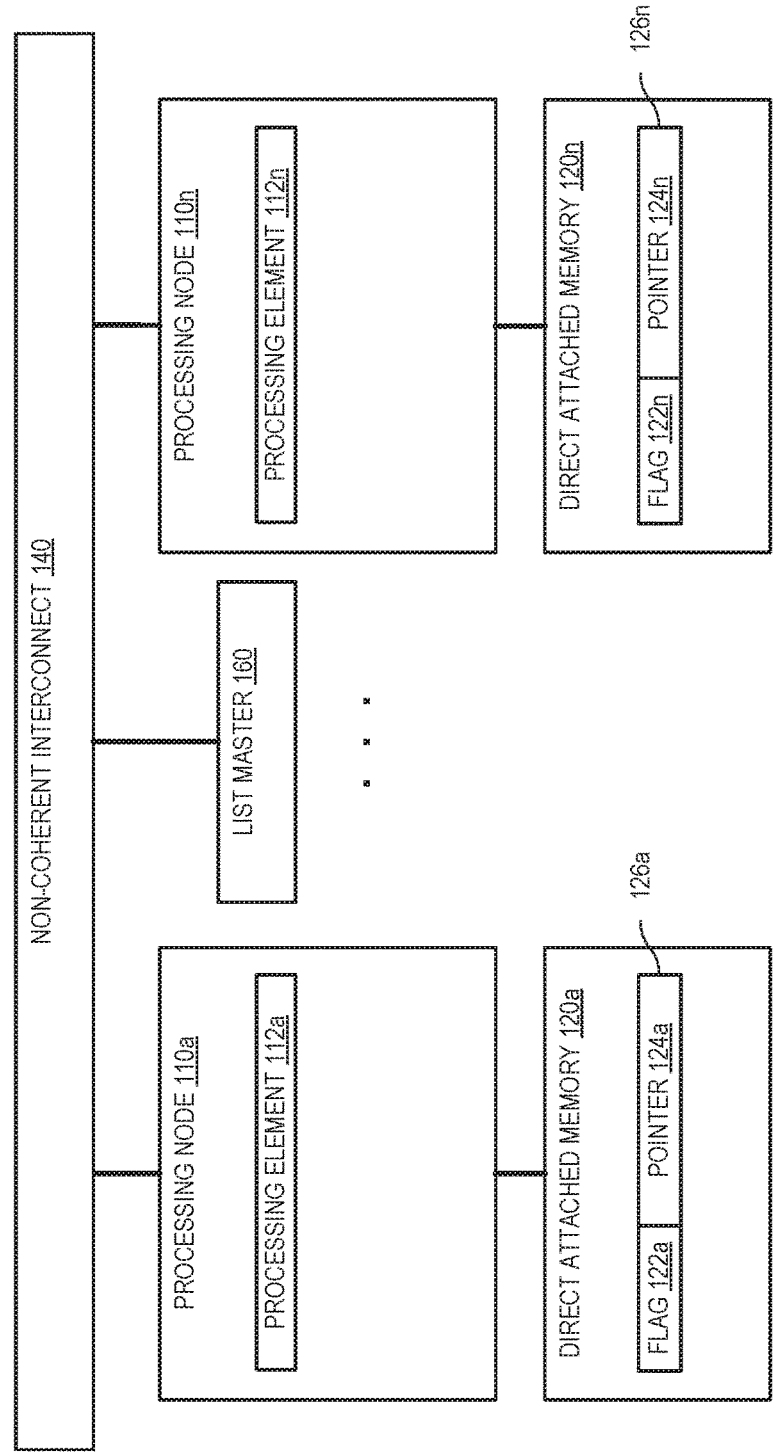
FIGS. 1, 2, and 3 are block diagrams of computing systems capable of locking resources used by multiple processing nodes, according to various examples.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Some hardware architectures may share memory between processors. In these architectures, a large number of processors may share memory to support efficient and flexible inter-process communication. At smaller scales, shared memory is mature technology that is used within popular multi-core processor chips from multiple hardware vendors. These shared memory multiprocessors are often single chip devices that incorporate one or more caches, which support cache coherent load and store operations, executed by the multiple processors. In many systems, cache coherent multiprocessors can be scaled to a few processor chips each containing multiple cores.

However, potential benefits for large-scale shared memory may be more difficult to achieve, due to a lack of coherence across a memory fabric. As used herein, coherence refers to the consistency of shared data across multiple clients, such as processors, processor cores, or nodes. A memory fabric refers to a group of computing nodes, such as symmetrical multiprocessor (SMP) systems, that are communicatively coupled by high bandwidth interconnects to provide unified computing systems. Each of the SMP nodes maintains coherency among the caches and memory for the various processors within that SMP node. Thus, as used herein, the cache and memory in a particular SMP system is considered to be within that system's coherence domain. The use of non-coherent shared memory allows the use of simpler hardware, which is easier to scale. However, in non-coherent shared systems, inter-processor communication has to be programmed in software.

When all memory access operations that access a specific region of memory are executed on any of the processors within a single processing node, these operations may utilize the processing node's cache and these memory reference operations are coherent. The processing node's cache remains in a consistent state so that each processor within the processing node sees a consistent sequence of values for every memory location in the region that is accessed. This is true because every load and store operation can be processed by the processing node's cache to ensure that all processors in the processing node see a consistent value. This coherence can be maintained even when multiple processors within a single processing node reference locations in fabric memory or when they reference a remote processing node's direct attached memory. On the other hand, since the memory interconnect that connects processing nodes is non-coherent, then memory accesses that are executed on processors within multiple processing nodes are not coherent. For example, if a processor in a local processing node were to store a value to an addressed location in the its direct attached memory, and subsequently a processor within the remote processing node were to perform a load operation to the same memory address, it cannot be assumed that the most recently stored value is loaded on the remote processing node.

Multiprocessor computer systems use parallel processing to improve performance. Multiple cooperating threads of execution are used to speedup time consuming processing tasks. Mutually exclusive access is often needed to guarantee the correctness of parallel programs that operate on shared resources. A shared resource can be a hardware device or a data structure in shared memory.

Mutual exclusion means that, at most, one thread has ownership at a time. After a thread acquires ownership of the resource, then the thread that owns the resource can freely access or modify that resource before releasing ownership. After ownership is released, another thread can acquire ownership and use the resource.

For shared memory multiprocessors, mutual exclusion has been traditionally controlled by spinlocks, semaphores, or other parallel programming constructs. These constructs can be implemented using special atomic hardware processing operations such as fetch-and-add or compare-and-swap that perform a critical operation on memory in an atomic fashion without interference by other parallel threads of execution that are trying to modify the same memory location.

However, a challenge occurs when these locks are implemented using a multiprocessor system having more than one cache, for example, when there are multiple processing nodes in a system that each are locally coherent, but are incoherent with respect to each other. As used herein, a processing node is a shared memory processor that has one or multiple processors within the processing node that is organized as a coherent shared memory processor. Each processing node includes a direct-attached local main memory (e.g., random access memory) as well as one or multiple caches within the processing node. Each time an atomic operation is executed, communication can be necessitated among all of the cached copies of the memory value that is modified by the atomic operation. With high resource contention, execution of shared atomic operations can cause excessive cache contention that is sometimes called cache line bouncing as multiple Central Processing Units (CPUs) execute atomic operations that reference a shared and cacheable memory location. As used herein, an operation of set of operations are considered atomic if it appears to the rest of the system that the operation(s) occur instantaneously. In a multi node system, this is a guarantee of isolation from concurrent processing.

Accordingly, various examples disclosed herein relate to an approach for locking resources in a manner such that processing nodes locally poll for availability of the resource for use. As used herein, a "resource" is any physical or virtual component of limited availability within a computing system. A lock node data structure can be associated with each thread of execution that wishes to acquire a resource. In some examples, the lock node data structure can be considered a list element for a linked list. The lock node list elements form a linked list according to the order in which the resource was requested by the threads. A head lock node list element owns the resource. Other lock node list elements in the list are waiting for the resource to be released by a particular predecessor lock node list element in the list. The lock node list elements are each located on the processing node local to the thread that is waiting to use the resource. The lock node list elements can each include a flag that indicates whether the resource is available for the associated thread to use. The lock node list elements can further include a pointer to the next lock node list element waiting on the list. As noted, each of the lock node list elements can be local to the processing node that executes the thread that is waiting to use the resource. Once a thread that is associated with the head lock node list element uses the resource, the associated pointer to the next lock node list element waiting on the list can be used to update the flag of that waiting lock node list element. That flag is polled by the thread locally on the processing node.

A benefit of having the flag local to the processing node is that each polling occurrence can be quick because the polling occurs locally. If the flag was on another node, polling would induce additional overhead and delay. As such, each lock node list element is placed locally to the processing node that executes the thread. The placement occurs even if the resource is external to the processing node. As discussed further herein, local and remote operations can be used to implement the placement of the lock nodes locally.

Figure 2:
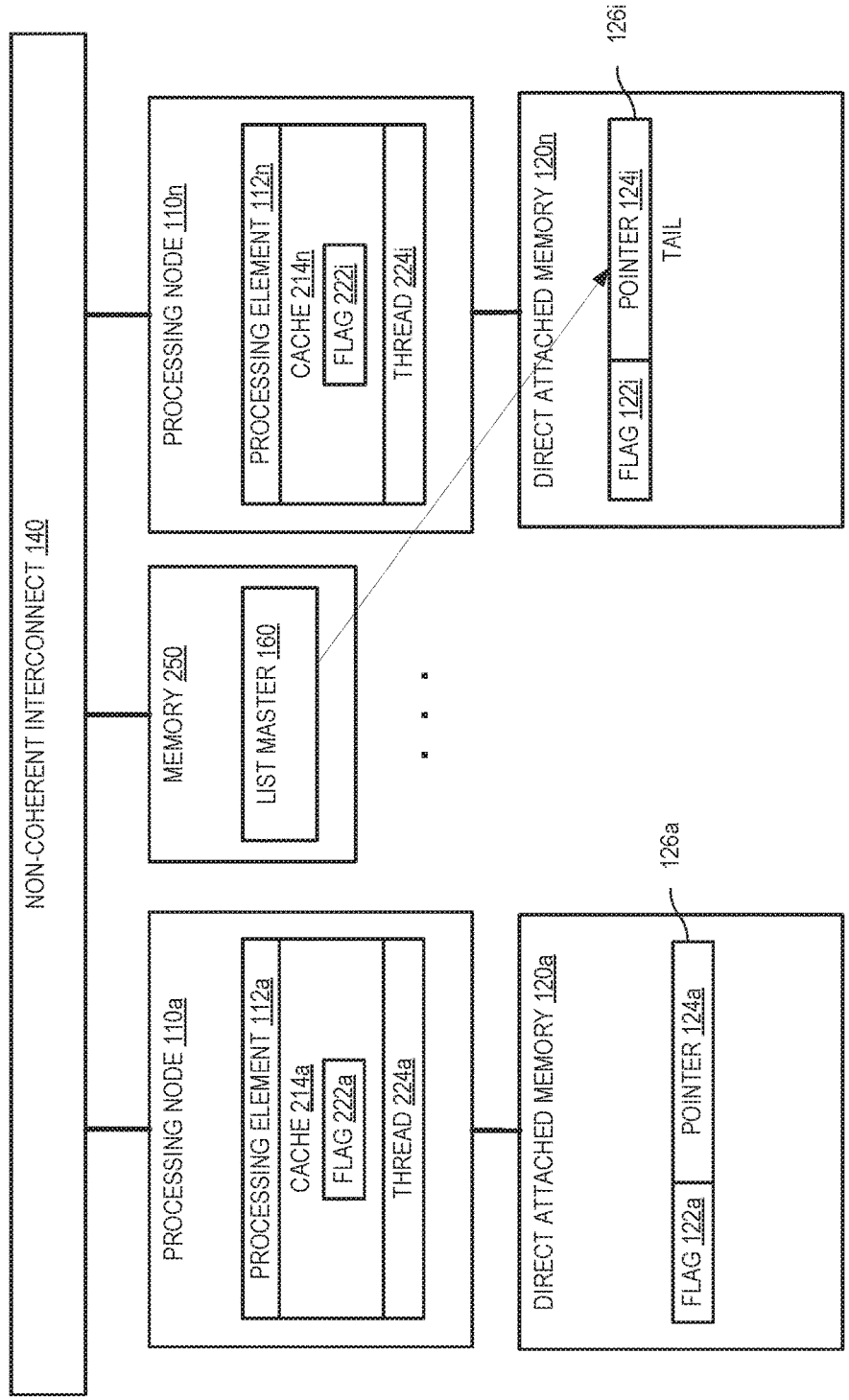
Figure 3:
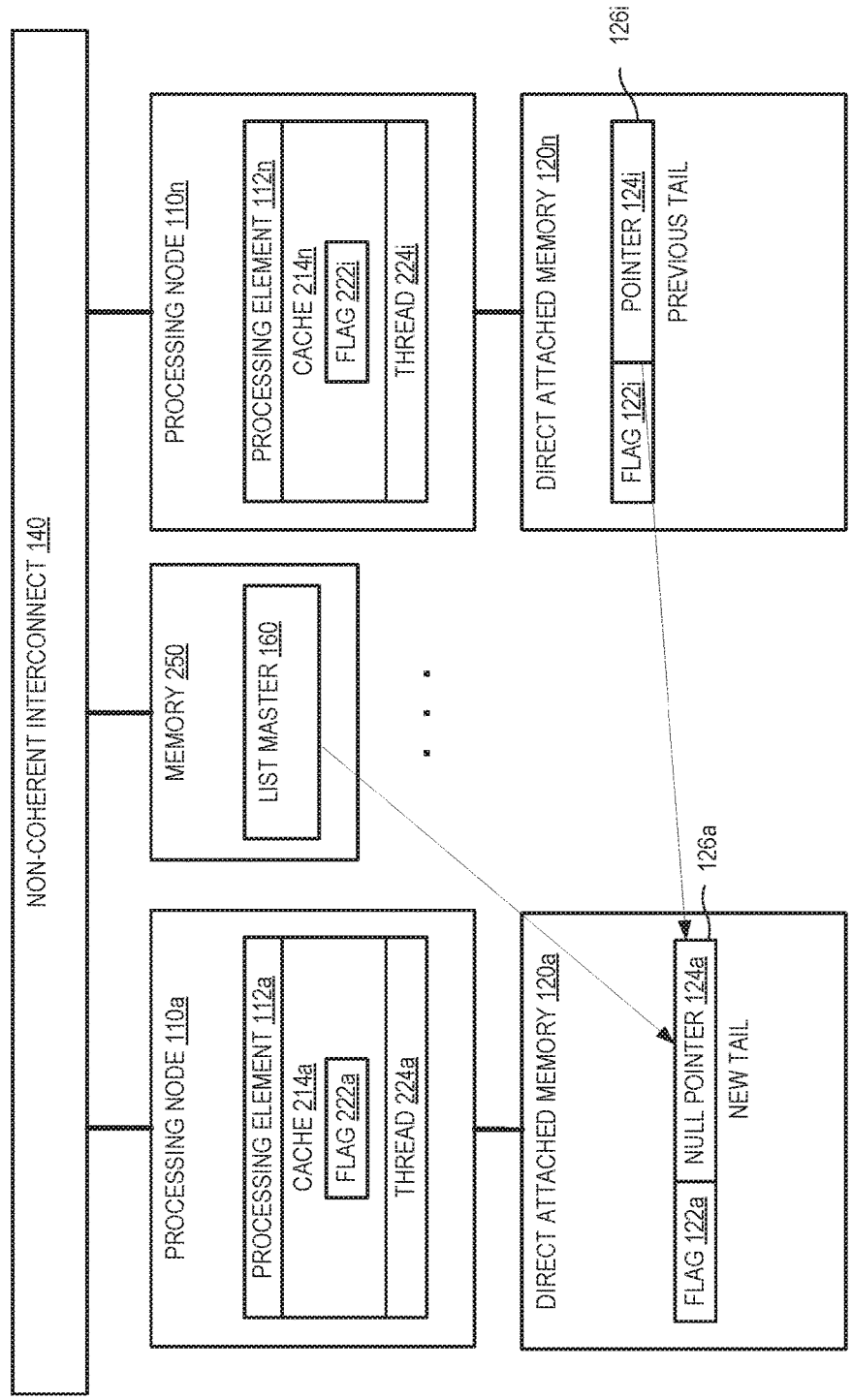

FIGS. 1, 2, and 3 are block diagrams of computing systems capable of locking resources between processing nodes, according to various examples. Computing system 100 shows an architecture of processing nodes 110a-110n each with respective processing elements 112a-112n that are capable of execution of instructions. Each processing node 110a-110n is attached to a direct attached memory 120a-120n. The processing nodes 110 can be connected via a non-coherent interconnect 140.

Connected to each of the processing nodes 110 (e.g., via the non-coherent interconnect 140) can be a list master 160, within a fabric memory device, for each resource that may be locked. The location of the list master 160 for each resource need not be the same. Further, the list master 160 can be located within the direct attached memory of one of the processing nodes, but be accessible by the other processing nodes via the non-coherent interconnect. The list master 160 is a data structure whose location can be known by each of the processing nodes 110, for example, via a mapping table (e.g., a table including each resource and the corresponding location of the list master for that resource). Though the example shown herein is explained in terms of a single resource for simplicity of explanation, it is intended that the same approach can be used for multiple resources. The list master 160 can include a pointer to the location of the tail of a linked list of list elements 126a-126n associated with that particular resource. Each list element 126a-126n can include a flag 122a-122n that indicates whether a thread 224 polling the flag has access to use the resource as well as a pointer 124a-124n to the next list element 126 in the linked list of list elements 126 associated with that resource. Use of the resource can be mutually exclusive among threads 224. Going one step further, use of the resource can be mutually exclusive between processing nodes 110 as well.

As noted above, a list element 126 can be associated with each thread of execution that wishes to acquire a resource. The lock node list elements for the resource form a linked list according to the order in which the resource was requested by the threads. A head lock node list element owns the resource and the corresponding thread and processing node can use the resource.

Other list elements in the list are waiting for the resource to be released by a particular predecessor lock node in the list. As noted, the list elements are each located on the processing node local to the thread that is waiting to use the resource. As noted, each of the list elements can be local to the processing node that executes the thread that is waiting to use the resource. Once a thread that is associated with the head list element uses the resource, the associated pointer to the next list element waiting on the list can be used to update the flag of that waiting list element. That flag is polled by the thread locally on the processing node.

In this example each of the processing nodes 110 are connected with a non-coherent memory interconnect. This allows memory operations such as load or store operations that are executed from some local processing node to access remote memory locations that reside within a fabric memory that is attached to the interconnect, or that reside in the direct-attach memory of a remote processing node.

In one example, the memory in the fabric memory and each of the direct-attached memory can be addressed in a global address space. Each of the words in all of the memory has a distinct physical address, and each processor can access any word using that address. In one example, the physical address for a memory location can be used to direct or route any memory access operation across the non-coherent fabric and to the correct memory location.

In another example, the non-coherent interconnect can use another addressing scheme. For example, a global address might be considered as a pair of numbers (n,a), the first number n uniquely identifies the processing node and the second number a uniquely identifies the address of the desired word within the processing node's local memory. Blocks of fabric memory could also be identified as having a processing node identifier, which can be used for access. In such systems, the global pointers could be replaced by a pair of numbers that can be used to perform operations on memory locations.

Computing system 200 correlates with computing system 100. The computing system 200 is in a state where there is a linked list of list elements for the resource that are used for indicating to their associated threads that the resource is free for the thread to use. A number of list elements 126 can be waiting for the resource. The list elements 126 can have a head list element (not shown) that is associated with the thread and processing node 110 that currently has access to the resource. The head list element has a pointer (not shown) that points to the next list element in the list.

The list master 160 for the resource has a reference address to the tail list element 126i of the linked list. If the resource is available, the list master has a NULL pointer, which indicates that the resource is free and that there is no thread currently waiting. In this example, the tail list element is list element 126i. The list element 126i includes a flag 122i that has a value that indicates whether the resource is free for use by a thread 224i associated with list element 126i. The thread 224i is to be executed by the processing node 110n. In this example, the flag 122i currently indicates that the resource is not free to be used by the thread 224i. The thread 224i, which is executed using processing node 110n, can locally poll the flag 122i for when the resource is free to be used by thread 224i.

Another thread 224a to be executed by processing element 112a on processing node 110a wishes or desires to use the resource. Because use of the resource is mutually exclusive between threads, processing node 110a can determine that the resource is to be locked for use by thread 224a. In response, processing node 110a can create a new instance of a list element 126a in its direct attached memory 120a. The processing node 110a can have access to a data structure (e.g., a mapping table of resources to list masters) to look up the location of the list master 160 for the resource. The list master 160 can be located in a memory 250 of the computing system 200 that is connected via the non-coherent interconnect 140.

Computing system 300 of FIG. 3 correlates with computing system 200. The computing system 300 is in a state where list element 126a has been created. The list master 160 points to the location of the tail of the current list of list elements waiting for the resource. If the list was empty, the list master 160 would have a null pointer. In this case, the value of the flag 122a would be set to indicate that the resource is free for the thread 224a to use.

In this example, the list master 160a previously pointed to list element 126i. The processing node 110a retrieves the location of the previous tail, list element 126i. Further, the processing node 110a updates the list master to point to list element 126a as the new tail of the list. Moreover, processing node 110a updates the pointer 124i in list element 126i to refer to list element 126a. The flag 122a is set to indicate that the resource is locked and is not free for the thread 224a to use. A copy of the flag 222a can be copied to a cache 214a of the processing node 110a. The flag can be locally polled by the processing node either in the cache 214a or in the direct attached memory 120.

In one example, a remote store operation can be used to update pointer 124i. In the example, the remote store operation "remote_store(rptr, nv)" is implemented using a sequence of one or more machine instructions that are executed on a processing element. The operation uses two inputs that are often stored in a computer register to change a location in memory. For this example, the value rptr is the address of a remote location within the direct attached memory of any remote (or the local) processing node 110. After the execution of the remote store is determined to be complete, the memory at the address rptr is assigned a new value nv. This value may be deposited either in the memory location in the direct attached memory location of the remote node or in a cache location in the remote node that is associated with the remote memory location, or both. In this example, the rptr can include the value retrieved from the list master 160 and the nv can include a reference to list element 126a. Thus, after the execution of the remote store operation is complete, any load operation that is executed on the rptr location will return the nv.

In another example, an atomic fetch and store operation, "rfetch_and_store(rptr, lval)" can be used to fetch the tail from the list master 160 and to store the location of the new tail. The operation has two inputs, the remote pointer rptr, and the local value "lval". The rptr address points to a location in the direct attached memory 120 of some remote or the local processing node. The execution of the operation performs acquires a remote value in the remote location as indicated by a remote address pointer and atomically overwrites that remote location with the local value. If multiple applications execute rfetch_and_store operations in parallel, and they all reference a common remote memory location, then the values placed in, and retrieved from, memory is to be consistent with some sequential execution of those operations.

At this point, list element 126a has been added to the list of list elements for the resource. Because list element 126a is the tail of the list, pointer 124a is set to NULL. As noted above, the list can be traversed from head to tail, where the head list element is the list element that has its corresponding flag set to indicate that the resource is available for the associated thread to use. When the thread is done using the resource, the associated processing node can execute an unlock function. If the pointer 124 for the next list element is NULL, the list master 160 can be updated to indicate that the resource is free to be used. If the pointer 124 is not NULL, the next list element in the sequence (based on the pointer 124 of the head list element) is unlocked by updating the successor's flag.

Going back to the example, of FIG. 3, a predecessor node can unlock list element 126i by using a remote store to update flag 122i to indicate that the resource is available for use by thread 224i. This also indicates that the resource is locked from use by other threads. In one example, flag 222i is polled by the thread 224i. Because the direct attached memory 120 is coherent with the cache 214n on node 110n, when flag 122i is changed, flag 222i is updated (e.g., by marking it dirty and then updating during the next polling). Accordingly, thread 224i is free to use the resource. When thread 224i has completed usage of the resource, the processing node 110n can use the unlock function to unlock the next list element in the list, list element 126a, which is pointed to by pointer 124i. In this example, the unlock function can use a normal load operation to load the pointer 124i. The unlock function can determine whether the pointer is NULL. In this case, the pointer is not NULL.

Accordingly, the flag 122a associated with list element 126a is unlocked. The unlocking can be accomplished by processing node 110n using a remote store with a rptr of pointer 124i (and/or an associated offset to point to flag 122a) and the new value for the flag 122a indicating that the thread 224a should have access to the resource. Due to cache coherence between the processing node 110a and the direct attached memory 120a, flag 222a can be updated in response to flag 122a being updated. The thread 224a then owns the resource and may freely use the resource without interference from other threads of execution.

When the thread 224a has completed use of the resource, the unlock function can be executed. In this example, the unlock function loads pointer 124a, which is NULL. This indicates that there is no success to list element 126a that is waiting for the resource and the list master 160 should point to this list element 126a. A remote compare and swap is used to atomically verify that the list master 160 retains a pointer to this list element 126a and this operation sets the master lock to NULL if this is true. Otherwise, a new thread has recently changed the list master 160 pointer to point to a new successor and then this successor list element is unlocked using a remote store.

As used herein, a remote compare and swap operation "rcompare_and_swap(rptr, ov, nv)" includes three inputs, three inputs, the remote pointer "rptr", and the old value ("ov") and new value ("nv"). The remote pointer "rptr" points to a memory location within any local or remote memory. In this case, the rptr is the location of the list master 160, the old value is the location of list element 126a and the new value is NULL. The execution of the rcompare_and_swap operation performs an atomic operation on the remote value pointed to by rptr. If the value pointed to by rptr does not exactly match the old value, then the operation returns false. If the value pointed to by rptr exactly matches the old value, then the new value is stored into the memory location pointed to by rptr. If multiple applications execute rcompare_and_swap operations in parallel, and they all reference a common rptr address location, then the values placed in memory and the returned values will be consistent with some sequential execution of those rcompare_and_swap operations.

Processing elements 112 may be, one or multiple central processing unit (CPU), one or multiple semiconductor-based microprocessor, one or multiple graphics processing unit (GPU), other hardware devices suitable for retrieval and execution of instructions stored in machine-readable storage medium, or combinations thereof. The processing element 112a-112n can be a physical device.

The non-coherent interconnect 140 can be used to implement a fabric memory where direct attached memory 120 between multiple processing nodes 110 are globally addressable. Processing nodes 110 are coherent with their respective direct attached memory 120. In some examples, the non-coherent interconnect 140 can be implemented using a communication network, such as the internet or InfiniBand. The network would support the operations described to remotely update memory associated with the various processing nodes 110 as described herein.

Implementation and coordination of the resources in the computing systems 100, 200, 300 can occur using software instructions that are executed using hardware. In one example, software instructions such as remote store, remote compare and swap, and remote fetch and swap can be implemented as part of a middleware software, an operating system, or a library. Similarly, coordination between threads can be coordinated using software instructions that are executed by hardware. For example, the software instructions being executed by various processing nodes 110 can guarantee that a thread does not use a particular resource unless its associated flag indicates that the thread is free to use the resource.

Communications networks can use wired communications, wireless communications, or combinations thereof. Further, a communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, a communication network can be in the form of a direct network link between devices. Various communications structures and infrastructure can be utilized to implement the communication network(s).

Figure 4:
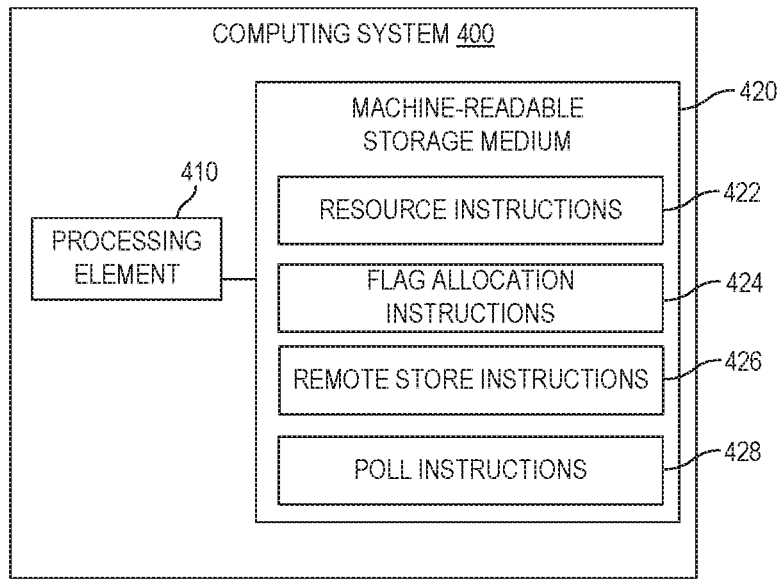
FIG. 4 is a block diagram of a computing system capable of locking resources between multiple processing nodes using remote storage operations, according to an example.

FIG. 4 is a block diagram of a computing system capable of locking resources between multiple processing nodes using remote storage operations, according to an example.

Figure 5:
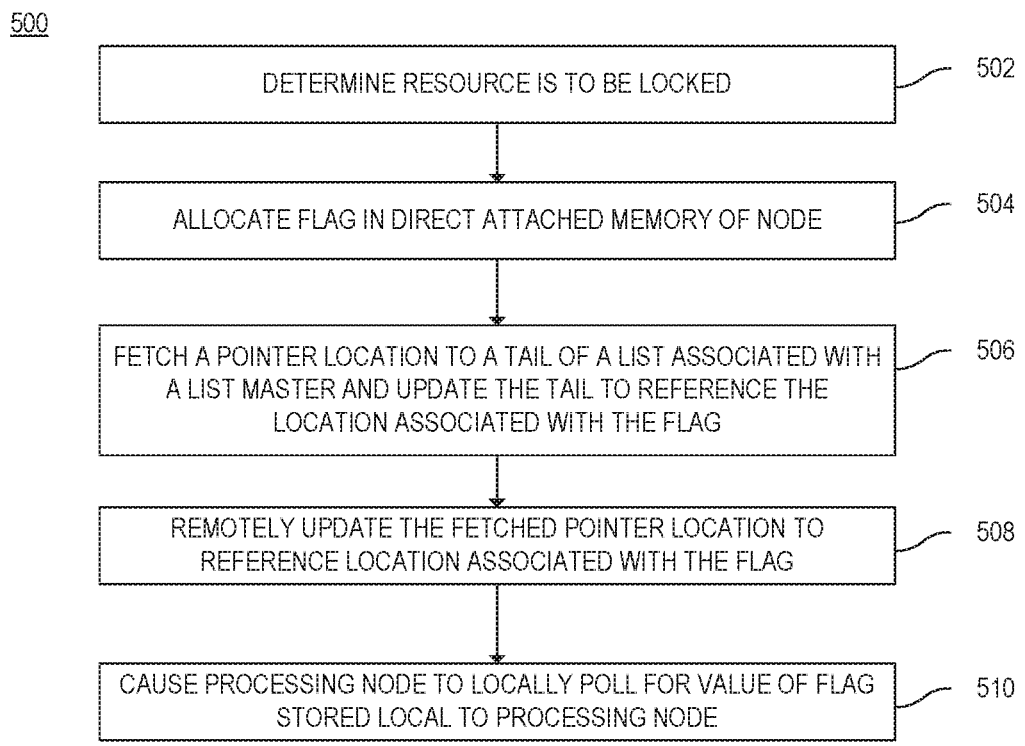
FIG. 5 is a flowchart of a method for managing a resource that can be used among multiple processing nodes using remote storage operations and polling local to each processing node, according to an example.

FIG. 5 is a flowchart of a method for managing a resource that can be used among multiple processing nodes using remote storage operations and polling local to each processing node, according to an example.

Although execution of method 500 is described below with reference to computing device 400, other suitable components for execution of method 00 can be utilized (e.g., computing system 100, 200, or 300). Method 500 may be implemented in the form of executable instructions stored on a machine-readable storage medium, such as storage medium 420, and/or in the form of electronic circuitry.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426, 428 to implement application of a policy to a packet stream based on a host value determined from a message of the packet stream. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for enforcing a policy to a packet stream traveling via a proxy connection.

Computing system 400 can be part of a larger computing system that includes multiple processing nodes. Computing system 400 can represent one of the processing nodes in the larger computing system. Each processing node is attached to a direct attached memory such as the machine-readable storage medium 420. The processing node and its direct attached memory are coherent. The processing nodes can be connected via a non-coherent interconnect.

Connected to each of the processing nodes can be a list master for each resource that may be locked. The location of the list master for each resource need not be the same. Further, the list master can be located within the direct attached memory of one of the processing nodes, but must be accessible by the other processing nodes via the non-coherent interconnect. The list master is a data structure whose location can be known by each of the processing nodes, for example, via a mapping table (e.g., a table including each resource and the corresponding location of the list master for that resource). Though the example shown herein is explained in terms of a single resource for simplicity of explanation, it is intended that the same approach can be used for multiple resources.

The list master can include a pointer to the location of the tail of a linked list of list elements associated with a particular resource. Each list element can include a flag that indicates whether a thread polling the flag has access to use the resource as well as a pointer to the next list element in the linked list of list elements associated with that resource. Use of the resource can be mutually exclusive among threads. As noted above, use of the resource can be mutually exclusive between processing nodes as well.

As noted above, a list element can be associated with each thread of execution that wishes or desires to acquire a resource. The list elements for the resource form a linked list according to the order in which the resource was requested by the threads. A head list element owns the resource and the corresponding thread and processing node can use the resource.

Other list elements in the list are waiting for the resource to be released by a particular predecessor list element in the list. As noted, the list elements are each located on the processing node local to the thread that is waiting to use the resource. Each of the list elements can be local to the processing node that executes the thread that is waiting to use the resource. Once a thread that is associated with the head list element uses the resource, the associated pointer to the next list element waiting on the list can be used to update the flag of that waiting list element. That flag is polled by the thread locally on the processing node.

Method 500 is an approach for managing usage of a resource by adding a list element to the linked list waiting for the resource. In this example, a tail of the linked list associated with the resource is located on another processing node separate from computing system 400 and is connected via the non-coherent link. The other processing node is associated with its own direct attached memory, which the processing node is coherent with. The list can be in a state where the list master includes a pointer to a list element that includes a flag and a pointer to the next location on the list. At this state, the pointer to the next location on the list is NULL. The list element is stored on the direct attached memory of the other processing node. As noted above, the list element can be associated with a thread executing on the other processing node that is waiting for access to the resource. The thread can locally poll the flag.

At 502, resource instructions 422 can be executed to determine that the resource is to be locked for a thread executing on computing system 400. As noted, the computing system 400 represents a processing node with attached memory that is part of a larger computing system that includes multiple processing nodes that are each associated with direct attached main memory. As used herein, a main memory is a memory that processing elements can manipulate. In some examples, the resource instructions 422 can be part of a lock system that can be implemented at a middleware level, as a library, as an operating system component, or the like.

At 504, flag allocation instructions 424 can be executed to allocate a flag to poll to determine whether the resource is available for the thread. The flag can be part of a list element.

As such, a list element can be allocated. The list element is associated with a location in the direct attached memory of computing system 400.

At 506, the processing element 410 executes remote store instructions 426 to perform a remote fetch and store to fetch the tail of the list from the list master location. The location of the list element is stored at the list master. The location of the previous tail on the other processing node is fetched. The computing system 400 can set the flag to indicate that the resource is not free for the thread to use based on a determination that the fetched location is not NULL. If the fetched location is NULL, the flag would be set to indicate that the resource is free for the thread to use.

At 508, the processing element 410 executes remote store instructions 426 to perform a remote store to update the fetched pointer location to reference the location of the allocated list element/flag. Accordingly, the list element has been added to the list and is local to the processing node (computing system 400) that executes the thread. In certain examples, the remote store instructions 426 can include functionality described above for remote store, remote fetch and store, and remote compare and swap functions.

At 510, the poll instructions 428 are executed to cause the processing node (computing system 400) to locally poll a value of the flag to determine whether the resource is free for the thread. As noted, in this example, the flag is initially set to indicate that the resource is not free for the thread. In some examples, the flag is polled locally in a cache associated with the computing system 400 that is coherent with the direct attached memory where the flag is allocated.

Figure 6:
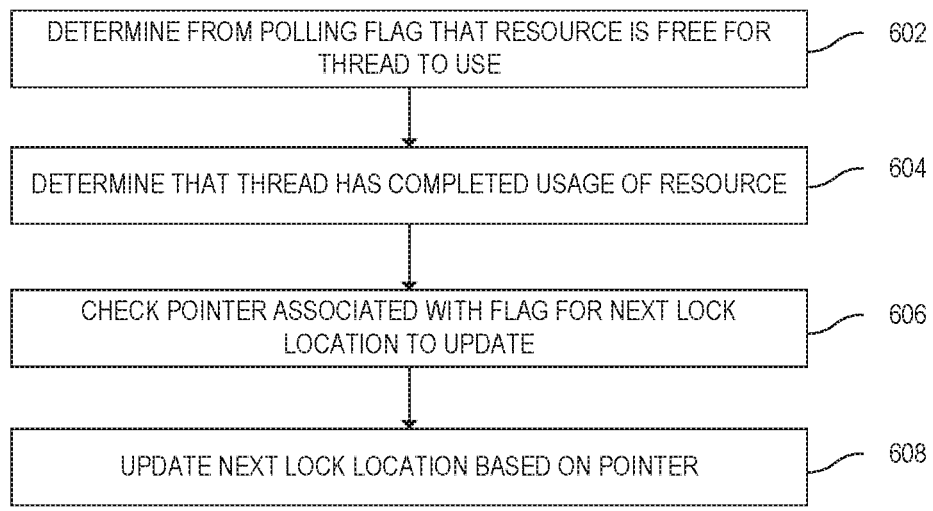
FIG. 6 is a flowchart of a method for updating a list representing locks after usage of a resource, according to an example.

FIG. 6 is a flowchart of a method for updating a list representing locks after usage of a resource, according to an example. This can be part of traversing the list from the head node. In this example, the flag associated with the previous tail on the other processing node is updated to indicate the thread associated with the other processing node has exclusive access to the resource to use. The update can be recognized by the thread as part of the polling process. Once the thread has completed use of the resource, the other processing node unlocks the next list element waiting in the list. The next list element is the list element associated with computing system 400. The other processing node uses a remote store to update the allocated flag on the computing system 400.

At 602, computing system 400 can determine from polling the flag that the resource is free for the thread of computing system 400 to use. The thread is then free to use the resource.

At 604, the thread has completed use of the resource. At this point, the thread can use an unlock function to remove itself from the list. As part of the unlock function, the pointer in the list element is checked to determine where the next list element's location is (606).

At 608, the next lock location is updated based on the pointer. If the location is a valid pointer location, a remote store is used to update the next lock location based on the pointer. If the location is NULL, the list master is updated using a remote compare and swap as described above.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing system comprising:
a plurality of processing nodes that are each associated with a direct attached main memory, wherein the direct attached main memory associated with the processing nodes are incoherent with respect to each other,
wherein the processing nodes include a first processing node with a first direct attached main memory to execute a thread that desires access to a resource;
a list master for the resource;
a first list element in the first direct attached main memory including a flag that is set to indicate that the resource is not free for the thread;
the first processing node to locally poll a value of the flag to determine whether the resource is free for the thread,
wherein the first processing node is to update a pointer within a previous tail list element of a list associated with the list master, the pointer to refer to a location associated with the first list element, wherein the previous tail list element is located in a second direct attached main memory associated with a second one of the processing nodes;
wherein the flag is updated, based on the pointer, to indicate that the resource is free.

2. The computing system of claim 1, wherein usage of the resource is mutually exclusive between the processing nodes based on the list.

3. The computing system of claim 1, wherein the first processing node further includes a cache that includes the value of the flag and wherein the first processing node locally polls the value in the cache.

4. The computing system of claim 1, wherein the list master for the resource is updated to point to the first list element.

5. The computing system of claim 4, wherein the list master for the resource is updated to point to the first list element and to fetch a location of the previous tail list element location using a remote fetch and store atomic operation.

6. The computing system of claim 1,
wherein the second processing node is to execute a second thread that desires access to the resource,
wherein the previous tail list element of the list includes a second flag that is associated with a value to determine whether the resource is free for the second thread.

7. The computing system of claim 6,
wherein the second processing node is further to locally poll the second flag to determine that the resource is free for the second thread before the resource is free for the thread; and
wherein the second processing node is to update the flag in the first direct attached main memory after the second thread determines to unlock the resource.

8. The computing system of claim 7, wherein the second processing node updates the flag using a remote store based on the pointer.

9. The computing system of claim 1, wherein the first processing node is further to update the list master using a remote compare and swap atomic operation to indicate that the resource is free after the thread has completed usage of the resource if the pointer is null.

10. A method comprising:
determining that a resource is to be locked for a thread in a system including a plurality of processing nodes that are each associated with a direct attached main memory,
wherein the list is associated with a list master,
wherein the direct attached main memory associated with the processing nodes are incoherent with respect to each other,
wherein the processing nodes include a first processing node with a first direct attached main memory to execute the thread;
allocating first list element including a flag in the first direct attached main memory that is set to indicate that the resource is not free for the thread to use;
using a remote fetch and store to fetch a first pointer location to a previous tail list element of a list associated with the list master and to update the previous tail list element to reference the first list element;
remotely updating the previous tail list element to reference the first list element; and
causing the first processing node to locally poll a value of the flag to determine whether the resource is free for the thread.

11. The method of claim 10, wherein usage of the resource is mutually exclusive between the processing nodes based on the list.

12. The method of claim 10, further comprising:
updating the flag, based on the fetched first pointer location, to indicate that the resource is free.

13. The method of claim 12, wherein the first processing node further includes a cache that includes the value of the flag, wherein the first processing node locally polls the value in the cache, and wherein the cache is coherent with the first direct attached main memory.

14. The method of claim 10,
wherein the processing nodes further include a second processing node that is associated with a second direct attached main memory,
wherein the fetched first pointer location is located in the second direct attached main memory,
wherein the second processing node is to execute a second thread that desires access to the resource,
wherein the fetched first pointer location is associated with a second flag that is associated with a value to determine whether the resource is free for the second thread.

15. The method of claim 14, further comprising:
polling, locally at the second processing node, the second flag;
determining that the second flag indicates that the resource is free for the second thread to use; and
updating, after the second thread uses the resource, the flag to indicate that the resource is free for the thread to use.

16. The method of claim 15, wherein the second processing node updates the flag using a remote store to the first list element based on the updated first pointer location.

17. A non-transitory machine-readable storage medium storing instructions that, if executed by a physical processing element of a computing system, cause the computing system to:
determine that a resource is to be locked for a thread in the computing system,
wherein the resource is associated with a list master;
wherein the computing system is part of system that includes a plurality of processing nodes that are each associated with a direct attached main memory, wherein the direct attached main memory associated with the processing nodes are incoherent with respect to each other, wherein the processing nodes include the computing system, which includes a first direct attached main memory and associated first cache that is coherent with the first direct attached main memory, to execute the thread;

allocate a first list element including a flag in the first direct attached main memory that is set to indicate that the resource is not free;

use a fetch and store to fetch a first pointer location to a previous tail list element of a list associated with the list master and to update the list master to reference the first list element;

remotely update the previous tail list element to reference the first list element using an atomic operation; and locally poll a value of the flag stored locally in the first cache to determine whether the resource is free for the thread.

18. The non-transitory machine-readable storage medium of claim 17, further comprising instructions that, if executed by the physical processing element, cause the computing system to:

determine that the value of the flag indicates that the resource is free for the thread; and update the list master to indicate that the resource is free for use after usage by the thread using a remote compare and swap if another pointer associated with the first list element is null.

19. The non-transitory machine-readable storage medium of claim 17, further comprising instructions that, if executed by the physical processing element, cause the computing system to:

determine that the value of the flag indicates that the resource is free for the thread; and update using a remote store, another location indicated by another pointer associated with the first list element that the resource is free for another thread associated with the other pointer to use.

* * * * *